May 22, 1956      J. JOZIF      2,746,444
COMBINED STARTING AND GEAR CONTROL DEVICE FOR MOTOR-CYCLES
Filed July 16, 1952
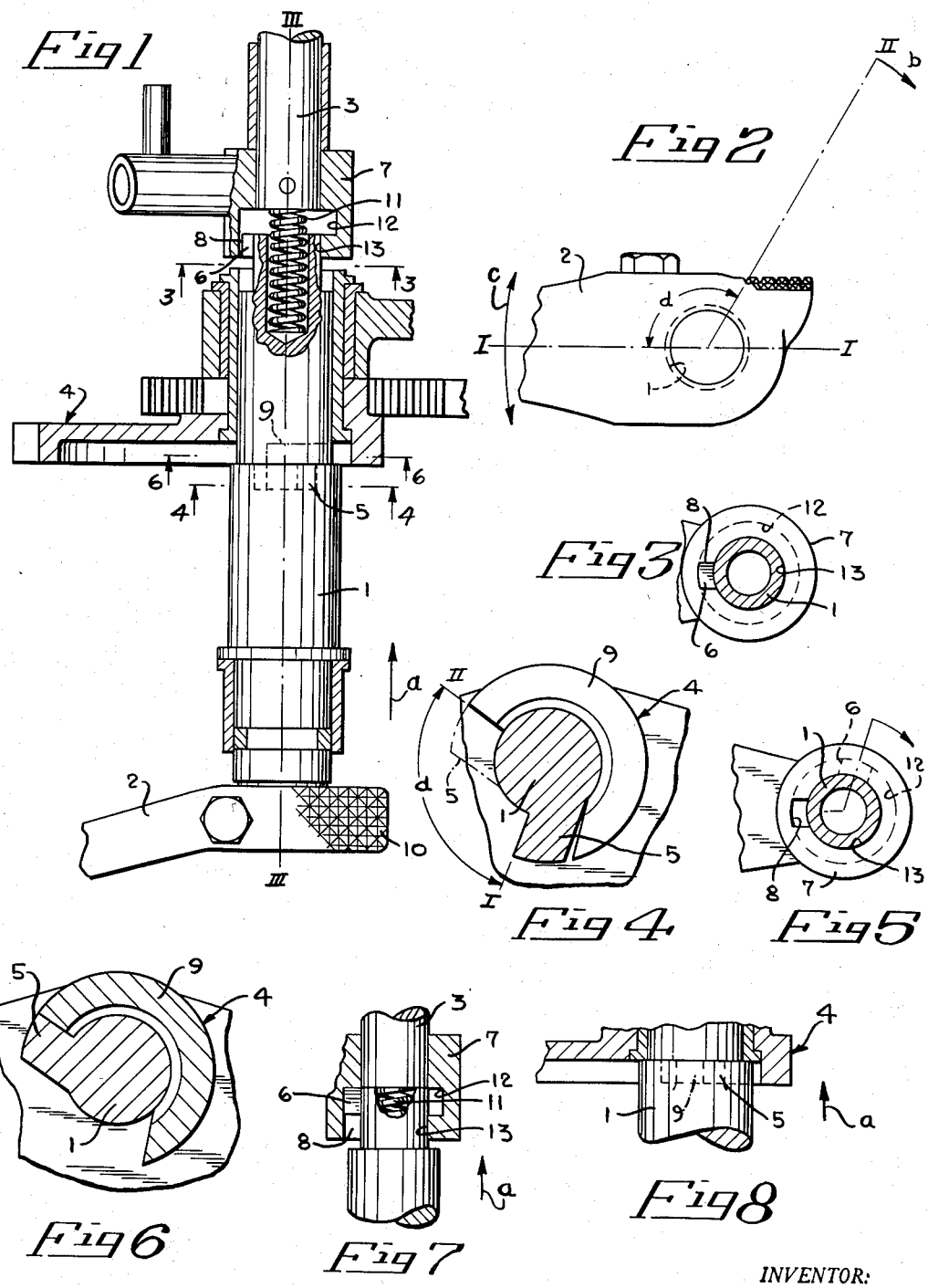
INVENTOR:
JOSEF JOZIF,
BY
HIS AGENTS.

United States Patent Office 2,746,444
Patented May 22, 1956

2,746,444

COMBINED STARTING AND GEAR CONTROL DEVICE FOR MOTOR-CYCLES

Josef Jozif, Prague, Czechoslovakia

Application July 16, 1952, Serial No. 299,135

Claims priority, application Czechoslovakia April 26, 1952

5 Claims. (Cl. 123—179)

In the conventional types of starting and gear control systems for motor-cycles there are two separate control levers placed in two different positions. One of said levers is provided for operating the starting the other for operating the gear change mechanism. Such arrangement, however, is rather complicated and moreover increases the number of protruding elements thus rendering more difficult the handling of the machine. In accordance with the present invention these drawbacks have been eliminated by controlling both the starting and gear change through the medium of a single control lever.

Fig. 1 is a longitudinal sectional view of the device in accordance with the invention in its outer, gear change position;

Fig. 2 is a front elevational view thereof;

Fig. 3 is a fragmentary sectional view in the outer, gear change position, taken on line 3—3 of Fig. 1;

Fig. 4 is a fragmentary sectional view in the outer, gear change position, taken on line 4—4 of Fig. 1;

Fig. 5 is a fragmentary sectional view similar to Fig. 3, but showing the parts in inner, starting position;

Fig. 6 is a fragmentary sectional view similar to Fig. 4, but showing the parts in inner, starting position, taken on line 6—6 of Fig. 1;

Fig. 7 is a fragmentary sectional view similar to Fig. 1, but showing certain parts in the inner, starting position; and Fig. 8 is a fragmentary sectional view similar to Fig. 1, but showing certain parts in the inner, starting position.

Referring now to the drawings, the shaft 1 is arranged so as to be able of turning, and of shifting in the direction of the axis III—III between an extreme outer, gear change position (Fig. 1) and another extreme inner, starting position (Figs. 7 and 8), and carries fixedly attached thereto a control lever 2 which latter in conjunction with said shaft is adapted for bringing about alternatively the gear change and starting operations. In the axis III—III the gear change control rod 3 (Fig. 1) is pivotally supported behind the shaft 1 so as to be secured against any shifting movement. On the shaft 1 the starter segment 4 is supported co-axially for angular displacement only.

The shaft 1 is provided with two claws 5 and 6 respectively, the claw 6 being provided at the inner end of reduced diameter of the shaft 1 engaged within a bore 13 that communicates with a circular recess 12 of a drive member 7 fixedly connected to said gear control rod 3. The bore 13 has a smaller diameter than the recess 12 and has a groove 8 that is operable to engage the claw 6. The recess 12 being of such arrangement as to enable the claw 6 to turn freely therein. The interconnection between the inner end of the shaft 1 and the drive member 7 is such that the claw 6 is engaged in the groove 8 on shifting the shaft 1 in a direction opposite to that indicated by the arrow a so that the shaft 1 and control rod 3 are firmly interconnected for turning together, through the drive member 7 and claw 6. On the shaft 1 being brought into the extreme position in the direction of the arrow a the claw 6 enters the circular recess 12 of the drive member 7 wherein it is free to turn so that the shaft 1 and gear control rod 3 are disengaged from each other so that the rod 3 remains at rest during the turning of the shaft 1.

The claw 5 is arranged on the shaft 1. The starter segment 4 which is freely turnable on the shaft 1 is provided on the inside with a drive claw 9. The mutual position of the claws 5 and 9 is such that on shifting the shaft 1 into the extreme position in the direction indicated by the arrow a the claw 5 will be placed in the same radial plane as the drive claw 9 so that on turning the shaft 1 in the direction indicated by the arrow b beyond the position II (Fig. 2), the starter segment 4 is driven about the axis III—III along with the shaft 1. On the shaft 1 being brought into the extreme position in the direction opposite to that of the arrow a the claw 5 is placed outside the position of registry with the drive claw 9 so that the starter segment 4 remains at rest during the turning of shaft 1. The arrangement and function of the starter segment are quite conventional.

On the shaft 1 being shifted into the extreme position in a direction opposite to that indicated by the arrow a with the control lever 2 being in its horizontal position I—I (Fig. 2), the device is in its outer or "gear change" position. In such position the gear control rod 3 is in rotary driving connection with the shaft 1 through the claw 6 and groove 8 provided inside the drive member 7 (Figs. 1 and 3), the claw 5 being beyond the position of registry with the drive claw 9 (Figs. 1 and 4). On the control lever 2 being moved in either of the opposite directions indicated by the arrow c the gear change mechanism of the gearbox (not shown) is brought into action, the starter segment 4 remaining at rest.

On the shaft 1 being moved into its extreme position in a direction indicated by the arrow a (Figs. 7 and 8) the device is in its inner or "starting" position. In such position the claw 6 is disengaged from the groove 8 and moved into the recess 12 of the drive member, the gear change control rod 3 being thereby released from its connection with the shaft 1. By displacing angularly in direction "b" (Fig. 2) the shaft 1 along with the lever 2 out of its horizontal position (I—I, Fig. 2; I, Fig. 4) by an angle "d" of about 110° into the position II (Figs. 2, 4, 6), the shaft 1 is locked in the operational extreme position in the direction of the arrow a, against retraction in the direction opposite to the arrow "a," by the claw 6 being engaged inside the recess 12 of the drive member 7 outside the groove 8. Simultaneously the claw 5 is brought into the position in registry with the drive claw 9 (Fig. 8) of starter segment 4 so that a further angular displacement of the shaft 1 puts the starter segment 4 in action.

The shaft 1 is shifted in the direction indicated by the arrow a through pedal pressure exerted on the oblique tread facet 10 provided on the hub of the opposite lever side (Figs. 1 and 2). The same effect may be obtained by any other suitable arrangement of lateral pedal action on the lever during displacement from position I to II. In this manner it is possible to shift first the shaft 1 in the direction of the arrow a thus disengaging claw 6 from the groove 8 and bringing it into the circular recess 12 of drive member 7. A further turning movement of the shaft 1 in the direction of the arrow b brings claw 5 into contact with the front face of the drive claw 9 (Fig. 6) thus preparing the device for the starting operation carried into effect through the lever 2 turning the shaft 1 and thereby the segment 4.

Shaft 1 is shifted in the direction opposite to that indicated by the arrow a through the effect of a spring 11 which, after the shaft 1 has been turned into a position wherein claw 6 is in registry with the groove 8 in the drive member 7, returns the shaft 1 and the control lever 2 automatically to its outer extreme (gear change) position in a direction opposite to that indicated by the arrow *a*.

I claim:

1. In a combined starting and gear control device for motorcycles having gearing and a starter, in combination, a shaft reciprocably shiftable axially between inner and outer extreme positions and turnable about its axis in either extreme position, a turnable gear shift actuator member, a turnable starter operator member, said members being arranged co-axially with said shaft for turning about the shaft axis and being restrained from shifting axially with said shaft, a projection disposed on said shaft near said actuator, said actuator having a hollow portion including a bore for said shaft and a passage for engaging said projection when disposed therein and for passing said projection and a circular recess communicating with said bore and passage, whereby said shaft will turn said actuator when said projection is disposed in said passage in the outer extreme shaft position and be disengaged therefrom when said shaft is shifted to the inner extreme position wherein said projection is disposed in said circular recess for turning idly, a claw connected to said shaft near said operator, said operator comprising a claw engaging element, said claw being operable to engage said element in the inner extreme shaft position and to be disengaged therefrom in the outer extreme shaft position.

2. In a device, as claimed in claim 1, said claw and claw engaging element being so arranged that interengagement therebetween will take place only following turning of the shaft in said outer extreme position beyond an angle of 90°.

3. In a combined starting and gear control device for motorcycles having gearing and a starter, in combination, a shaft reciprocably shiftable axially between two opposite extreme positions and turnable about its axis in either extreme position, means operable for normally biassing said shaft to be in a first of the extreme positions, whereby shifting and disposing of said shaft in the second extreme position takes place against said bias, a turnable gear shift actuator and a turnable starter operator arranged axially of said shaft for turning about the shaft axis and being restrained from shifting axially with said shaft, means intermediate said shaft and said actuator for coupling said shaft with said actuator for joint turning in one of said extreme shaft positions, and means intermediate said shaft and said operator for coupling said shaft with said operator for joint turning in the opposite extreme position and comprising a releasable locking arrangement operable upon shifting and turning of said shaft in said opposite extreme position to maintain said shaft shifted in said opposite extreme position against the force of said bias throughout at least a portion of a full turn.

4. In a combined starting and gear control device for motorcycles having gearing and a starter, in combination, a shaft reciprocably shiftable axially between a gear shifting position and a starting position opposite thereto and being turnable about its axis in either position, a turnable gear shift actuator member and a turnable starter operator member alternately engageable by said shaft for turning, means operable between the shaft and each member for engaging a member in the opposite positions of the shaft, biasing means operable for urging said shaft normally to engage one of said members, and latching means forming part of said engaging means and being operable for maintaining said shaft following shifting against said bias in engagement with the other member throughout a portion of a full turn.

5. In a combined starting and gear control device for motorcycles having gearing and a starter, in combination, a shaft reciprocably movable axially between a gear shifting position and a starting position opposite thereto, and being turnable about its axis in either position, a turnable gear shift actuator member and a turnable starter operator member alternately engageable by said shaft for turning about the shaft axis, means operable between said shaft and each member for engaging a member in the opposite positions of said shaft, resilient means biasing said shaft towards one of said positions, in which said shaft engages said gear shifting actuator member, the engagement means between said shaft and said gear shifting actuator member comprising a latch operable to maintain said shaft shifted against said bias throughout at least a portion of a full turn to maintain interengagement between said shaft and said starter operator member.

References Cited in the file of this patent

UNITED STATES PATENTS

| 991,521 | Maize | May 9, 1911 |
| 2,374,303 | Osborne | Apr. 24, 1945 |

FOREIGN PATENTS

| 395,466 | Great Britain | July 20, 1933 |